United States Patent [19]
Chrin et al.

[11] Patent Number: 6,049,540
[45] Date of Patent: *Apr. 11, 2000

[54] ENHANCED TELECOMMUNICATIONS SWITCHING UNIT

[75] Inventors: Christopher James Chrin; Meyer Joseph Zola, both of Lisle, Ill.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/856,842

[22] Filed: May 15, 1997

[51] Int. Cl.$^7$ .............................. H04L 12/66; H04L 12/50
[52] U.S. Cl. ............................................ 370/357; 370/376
[58] Field of Search .................................... 370/236, 241, 370/250, 351, 353, 357, 358, 359, 360, 363, 373, 376, 280, 294, 375, 392, 413, 422, 356, 412, 419

[56] References Cited

U.S. PATENT DOCUMENTS

| | | | |
|---|---|---|---|
| 4,207,435 | 6/1980 | Okada et al. ............................ | 370/68 |
| 5,444,700 | 8/1995 | Martikainen et al. .................. | 370/351 |
| 5,546,391 | 8/1996 | Hochschild et al. .................... | 370/413 |
| 5,557,609 | 9/1996 | Shobatake et al. ..................... | 370/413 |

OTHER PUBLICATIONS

Alles: "An Intelligent Network Processor for a Digital Central Office"; International Zurich Seminar on Digital Communications, Paper A–5, 1978, pp. 1–6.

*Primary Examiner*—Chau Nguyen
*Assistant Examiner*—Chiho Andrew Lee
*Attorney, Agent, or Firm*—Werner Ulrich

[57] ABSTRACT

An enhanced form of time switch. Serial bit streams received in input buffers are stored in parallel under program control in the cache of a pipe lined microprocessor. The microprocessor, under program control, then rearranges the received time slots and feeds them in parallel to output buffers from which serial bit streams are generated. Advantageously, program control is used to flexibly control the various functions of different time switches without requiring a change in the hardware.

11 Claims, 6 Drawing Sheets

ENHANCED TELECOMMUNICATIONS SWITCHING UNIT

TECHNICAL FIELD

This invention relates to method and apparatus for controlling digital switching of telecommunications signals.

PROBLEM

The digital revolution has been most conspicuous in its effects on computers and on telecommunication systems. In the latter field it has been found that by transmitting communication signals in digital form, the fidelity of the signal is improved and, importantly, many types of data communications can be performed over digital transmission facilities switched by digital switches.

In such digital switches one of the primary units for performing the digital switching function is a time slot interchange (TSI) unit. This unit performs switching by changing the position of a digital signal representing a particular communication from one position in a first digital bit stream to another position in the same or a second digital bit stream. Such a time slot interchange performs a major portion of the switching required to implement a digital telecommunications switch. Another primary unit is a time multiplexed switch (TMS) which changes the position of a digital signal from one space position to another in the same time slot period.

A problem of the prior art is that such digital switches have limited flexibility because the hardware connections within the switching units define precisely what functions can be accomplished by these units. As new needs arise, such limitations limit the capability for offering new types of digital communication services.

SOLUTION

The above problem is substantially alleviated and an advance is made over the teachings of the prior art in accordance with applicants' invention wherein the control of the switching of individual time slots or other basic data entities is directly performed by a program controlled processor. In applicants' preferred embodiment of the invention this processor is a microprocessor such as the Motorola/IBM 604e RISC microprocessor which is extensively used in the telecommunications industry. This processor controls the loading of a memory, in the preferred embodiment, the cache memory of the microprocessor, to accept serial inputs to the switch and assembles output signals selectively from the received signals in accordance with the desired connections required at any one time by the time slot interchange unit. Advantageously, the algorithms for rearranging the time slots or other data entities is not limited to simply delivering each output byte in accordance with the contents of a control memory, but can be adapted to other applications. For example, when a digital switch, such as the 5ESS® switch, manufactured by Lucent Technologies, is required to serve the 8 or 16 kilobit/second GSM speech standard for wireless telephony, a different TSI is required in the prior art; using applicants' invention, it is only necessary to change the software within the TSI.

DETAILED DESCRIPTION

Figure 1:
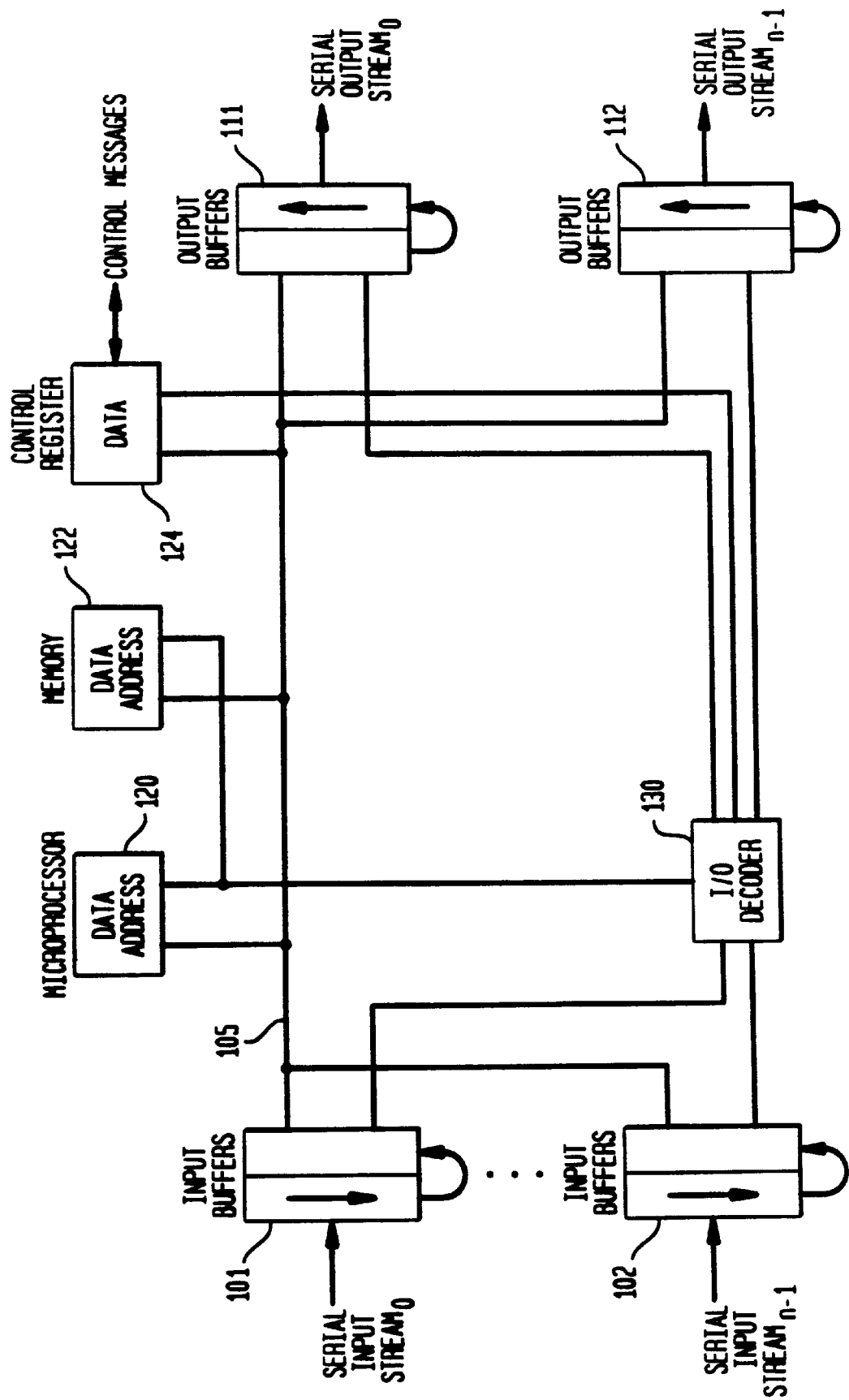
FIG. 1 a block diagram of a switch in accordance with applicants' invention.

FIG. 1 is a block diagram showing the input and output data streams of a time slot interchange unit in accordance with applicants' invention. In one preferred embodiment of applicants' invention, a 100 MHz PowerPC can switch 128 serial input and output streams each consisting of 32 time slots at a bit rate of 2.048 Mbits per second. The input comprises n serial input streams, stream zero being connected to input buffer 101, . . . , and serial input stream n minus one being connected to input buffer 102. The first input stream is collected in a shift register of input buffer 101 and then transmitted in parallel sequentially to a four stage, sixty-four bit per stage, buffer. The last stage of this buffer is connected to a series of sixty-four tri-state bus drivers for driving parallel bus 105. Also connected to parallel bus 105 are n output buffers 111, . . . , 112. These output buffers also comprise four stage, sixty-four bit registers, the input stage of which is connected to sixty-four bus receivers connected to bus 105 and the output stage of which is connected to a shift register for generating a serial output stream. Also connected to bus 105 is microprocessor 120 which accepts inputs in bursts of 256 bits as four associated 64 bit data bus reads from each of the n input buffers 101, . . . , 102 under the control of the program stored in the microprocessor. Similarly, the microprocessor delivers bursts of 256 bits as four associated 64 bit data bus writes to each of the n output buffers after having generated the output burst through the reading of the inputs under the control of a control map and of the program of the microprocessor.

An I/O decoder unit 130 under the control of the microprocessor is used to gate the tri-state outputs of the input buffers onto the bus and to gate the output of the bus into the n output buffers 111, . . . , 112. The I/O decoder receives inputs from the microprocessor address bus.

Also connected to bus 105 is a memory 122 for storing infrequently used data and program text such as data required for performing tests or diagnostics, and other non-cached TSI code, and as a backup for data stored in the microprocessor cache, such as the microprocessor program text and the path memory. Also connected to bus 105 is control register 124 which interfaces with a call processing controller or other switches of the telecommunications network, receives and transmits control messages.

Figure 2:
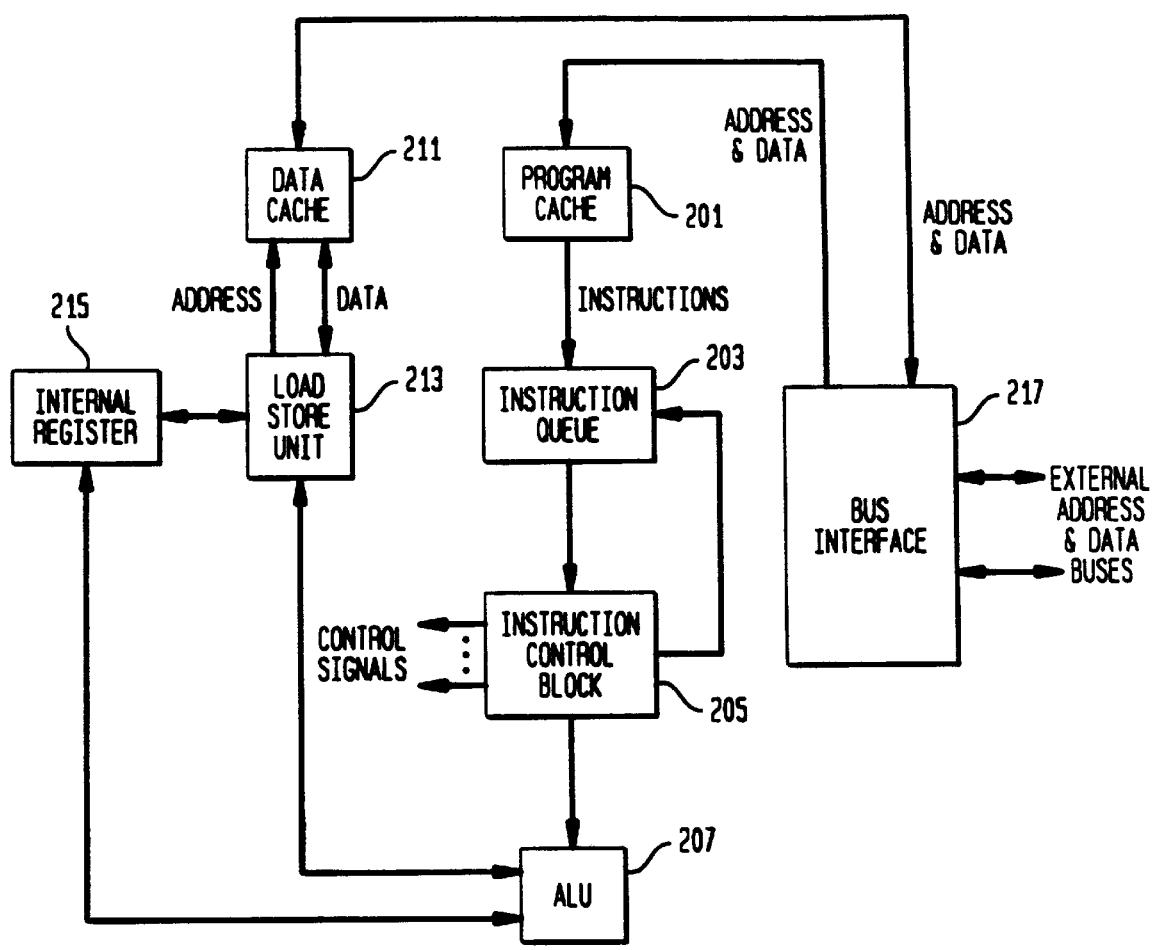
FIG. 2 is a block diagram of a microprocessor for use in that switch.

FIG. 2 is a block diagram those key parts of the microprocessor which are pertinent to the understanding of applicants' invention. The microprocessor contains a program cache 201 for storing the control program which controls the operations of the time slot interchange unit. The output of the program cache goes to an instruction queue 203 for storing a plurality of instructions in order to allow for the rapid execution of simple loops that is made possible using pipelining techniques. The instruction queue interacts with an instruction control block 205 to deliver the appropriate instructions to arithmetic and logic unit (ALU) 207. The ALU executes its received instructions and operates to perform the steps required by the instruction by controlling load store unit 213 which in turn accesses a data cache 211. ALU 207 also controls a group of internal registers 215 for short term storage and for the control of the microprocessor. A bus interface 217 communicates with the data cache 211, and, for changes in the software, also communicates with program cache 201.

Figure 3:
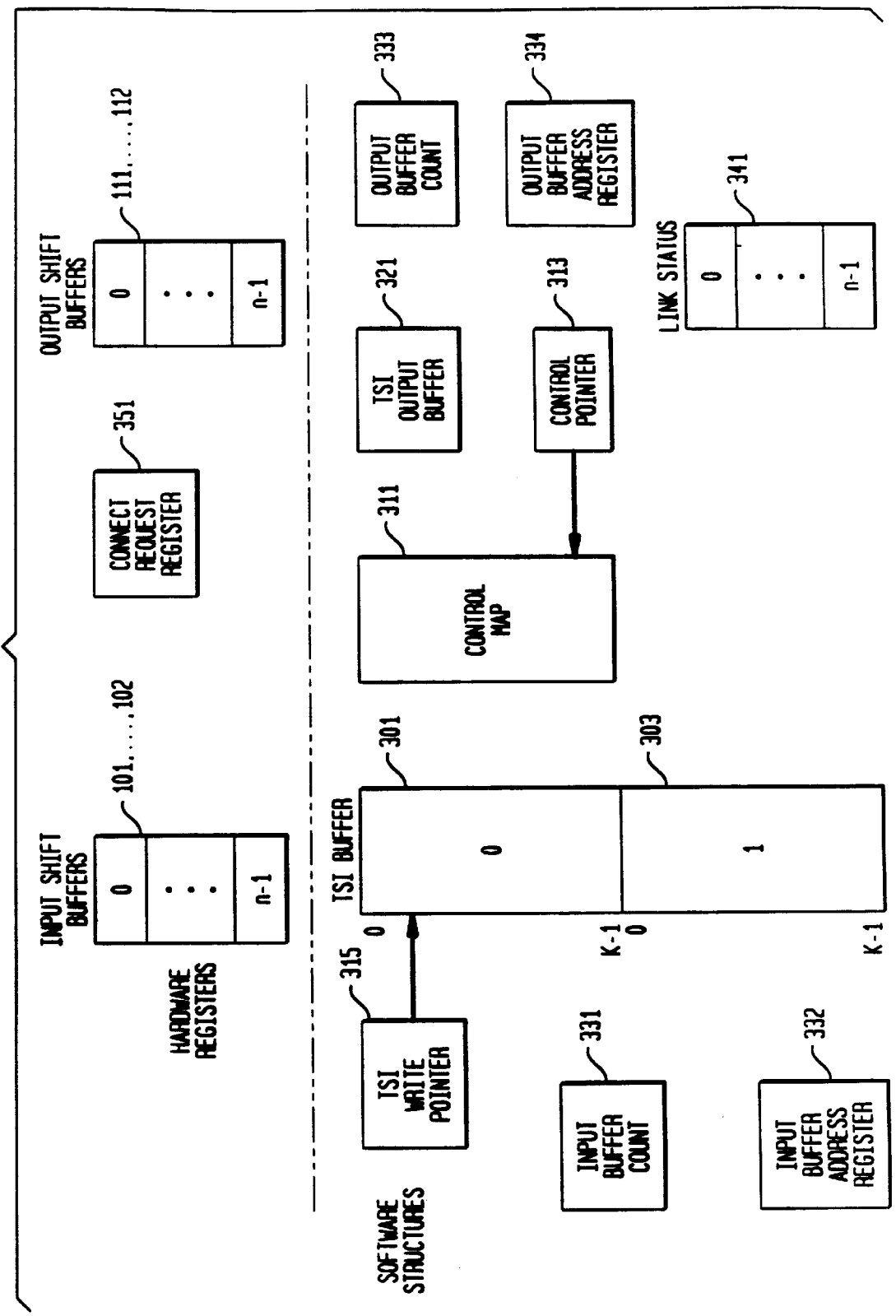
FIG. 3 is a layout of memory and registers used in that switch.

FIG. 3 shows pertinent memory data stored in data cache 211 of microprocessor 120. The contents of the data cache are expanded in FIG. 3 and contain, among other items, the data received from input buffers 101, . . . , 102 and the data to be delivered to output buffers 111, . . . , 112. Data received from the input buffers 101, . . . , 102 is stored in TSI buffer 301 or 303. The data from the various input buffers is stored sequentially in one of these buffers in applicants' preferred embodiment. In order to handle nx64 kilobit per second connections, the TSI buffer contains buffer 301 and a second buffer 303 for storing another frame of this serial input data. Buffers 301 and 303 are used alternately. Control map 311 is used to control the reading of the contents of TSI buffers 301 or 303 in order to generate an output for storage in the TSI output buffer 321 for transmission to one of the output buffers 111, . . . , 112. TSI write pointer 315 is used to keep track of where the next input from one of the input buffers 101, . . . , 102 is to be stored in TSI buffer 301 or 303. Similarly, control pointer 313 is used to point to the appropriate portion of control map 311 in order to control accessing the TSI buffer in order to obtain the time slots that are required to fill the TSI output buffer 321. Input buffer count 331 is used to control the cycling for accepting inputs from the appropriate one of the n input buffers 101, . . . , 102, selected by input buffer address register 332, and output buffer count 333 is used to control the distribution of an output collected in TSI output buffer 321 to one of the n output buffers 111, . . . , 112 selected by output buffer address register 334. Link status memory 341 is used to identify any of the n input links or any of the n output links that are out of service. This status can be checked prior to accepting an input from one of the n input buffers 101, . . . , 102 or prior to sending an output to one of the output buffers 111, . . . , 112.

The control map is altered under the control of the program of the microprocessor when the microprocessor receives a control message from connect request register 351 within the control register 124 of FIG. 1, the control message representing a request to establish or disconnect a connection in the time slot interchange unit. The process of controlling the control map is well known in the prior art.

Figure 4:
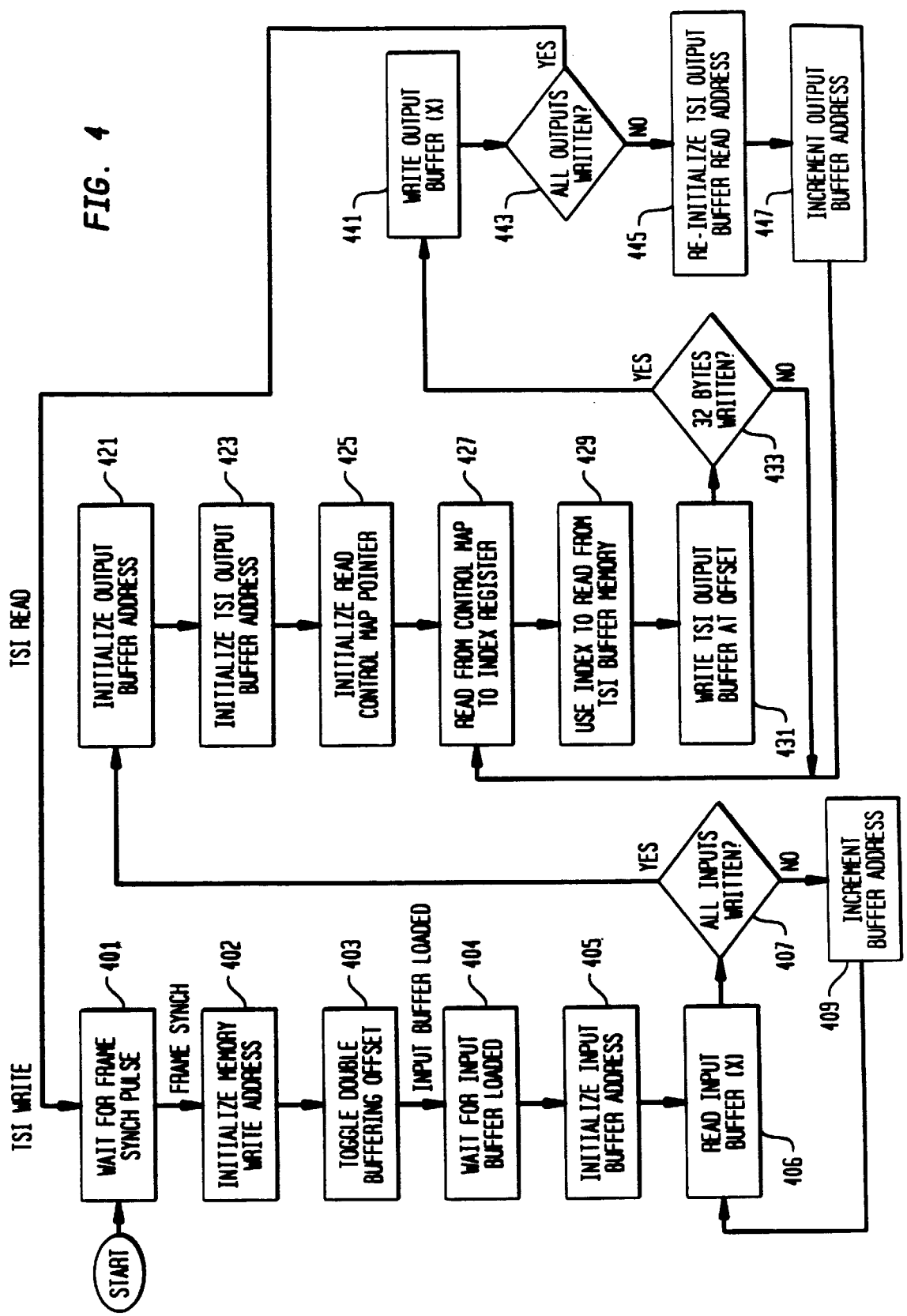
FIGS. 4 and 6 are flow diagrams of programs for controlling the switch.

FIG. 4 is a flow diagram describing the operation of the program for implementing a time slot interchange (TSI) in accordance with applicants' invention. The process starts with the microprocessor waiting for a frame synchronization pulse (block 401). When the frame synchronization pulse arrives, it signals the beginning of the synchronized loading of the input buffers 101, . . . , 102 from the serial input streams and triggers several initialization steps. The memory write address which is the TSI write pointer 315, is initialized (action block 402) so that the correct location in the TSI buffer 301 and 303 is established for writing the information from the input buffers 101, . . . , 102. The double buffering offset is toggled (action block 403) to choose either frame memory 301 or 303 in the TSI buffer for storing the input data on alternate frames. The microprocessor then waits for an input buffer loaded signal (action block 404), which establishes that the buffers 101, . . . 102 are full, and then the input buffer address is initialized (action block 405) to point to the first input buffer 101. In order to guarantee that action block 406 reads new data from the input buffer and not stale cached data from a previous cycle, action block 406 invalidates the cache data associated with the input buffer address before initiating the read. The input buffer pointed to by the input buffer address is then read (action block 406) in a burst as four connected 64 bit data bus operations and stored in the microprocessor cache memory in either TSI buffer 301 or 303 depending on the double buffering offset. Test 407 determines whether all inputs for this frame have been written. If not, then the buffer address is incremented (action block 409) and the next buffer is read into the TSI buffer (action block 406 previously described). This loop is continued until the results of test 407 indicates that all inputs for this frame have been written.

At this point the TSI read cycle begins. The output buffer address 334 is initialized (action block 421), the TSI output buffer address is initialized (action 423) and the control map pointer 313 is initialized to point to the top of the control map (action block 425). The contents of the control map are read to an index register (action block 427) and the index register is used to read the eight bit time slot from the TSI buffer (action block 429) (frame 301 or 303 is accessed depending on the double buffering offset established in action block 403). The read byte is then written into the TSI output buffer in the cache, at the appropriate offset (TSI output buffer 321) (action block 431) determined by which of the 32 bytes is being written. Test 433 is used to determine whether 32 bytes have been written; if not, action block 427 is re-entered and the loop repeats action blocks 427, 429, 431. When 32 bytes have been written, as indicated by a positive result of test 433, then 32 bytes are written from the cache (action block 441) by a data cache block flush operation in a burst of four connected 64 bit data bus writes into the output buffer 111, . . . , 112 specified by the output buffer address 334. Test 443 determines whether all outputs have been written. If not, then the TSI output buffer read address is re-initialized (action block 445). The output buffer address (output buffer address 334) is then incremented (action block 447), and the loop for writing into the output buffer is re-entered in action block 427. If test 443 indicates that all outputs have been written then the work for this frame is finished and the processor goes back to block 401 to wait for the next frame synchronization pulse.

The above flow chart describes an eight bit time slot where a byte quantity is read and written in action blocks 429 and 431. Sixteen and 32 bit time slots could easily be accommodated with a straightforward substitution of half word or full word microprocessor instructions for the corresponding load and store byte instructions. The time slot width can be further generalized to include group switching where contiguous time slots are switched as a group using load/store string instructions in an action blocks 429 and 431 to transfer a sequence of time slots. The total number of bytes of switched information per unit of time increases with increasing time slot width or group size, since the loop overhead of action blocks 427 through 433 is reduced proportionally relative to that of a byte wide time slot. This is very efficient for switching a 32 time slot PCM (E1) facility for implementing a crossconnect. Some group sizes like that of a T1 facility of 24 byte wide groups might be most efficiently switched by padding the 24 time slots to a 32 byte group. Groups can be concatenated contiguously to form higher bandwidth rates such as DS3 at the output of the output buffers; this is especially useful for performing the function of a digital access and cross connect switch such as the DACS-4 switch manufactured by Lucent Technologies Inc.

The above flow chart provides double buffering for all time slots whether they represent nx64 kilobits per second signals or a single 64 kilobit per second voice or data time slot. If the additional frame delay introduced by the double buffering is not desired for the single 64 kbit/sec voice or data time slot, then the flow chart can be modified to provide selective double buffering, i.e., the single voice or data time slot is not double buffered. Such single buffered time slots are marked in the control map 311, which causes the time slot to be read from the other one of the two TSI buffer frames 301 and 303, by negating the effect of the double buffer offset. Thus, single buffered time slots are read out of the opposite frame from the double buffered time slots.

Generalized TSI Flow

The flow chart shown in FIG. 4 is transversed only once per frame because each of the serial input streams was assumed to consist of 32 time slots, which in the present implementation is written into the microprocessor cache in a single 32 byte burst, as described when action block 406 was discussed.

Relatively simple modification of FIG. 4 is required in order to accommodate higher bandwidth serial links: 1) Another decision state is required after the "Yes" output of decision state 443 in FIG. 4. This determines whether the entire frame of time slots has been processed. If "Yes", we return to the wait state of block 401. If "No", we return to the wait for input buffer loaded block 404 for the next burst of 32 time slots. 2) The initialize read control map pointer action block 425 is moved out of the TSI read loop to the beginning of the TSI write cycle (after the initialize memory write address action block 402) since the entire frame has not yet been written.

Figure 5:
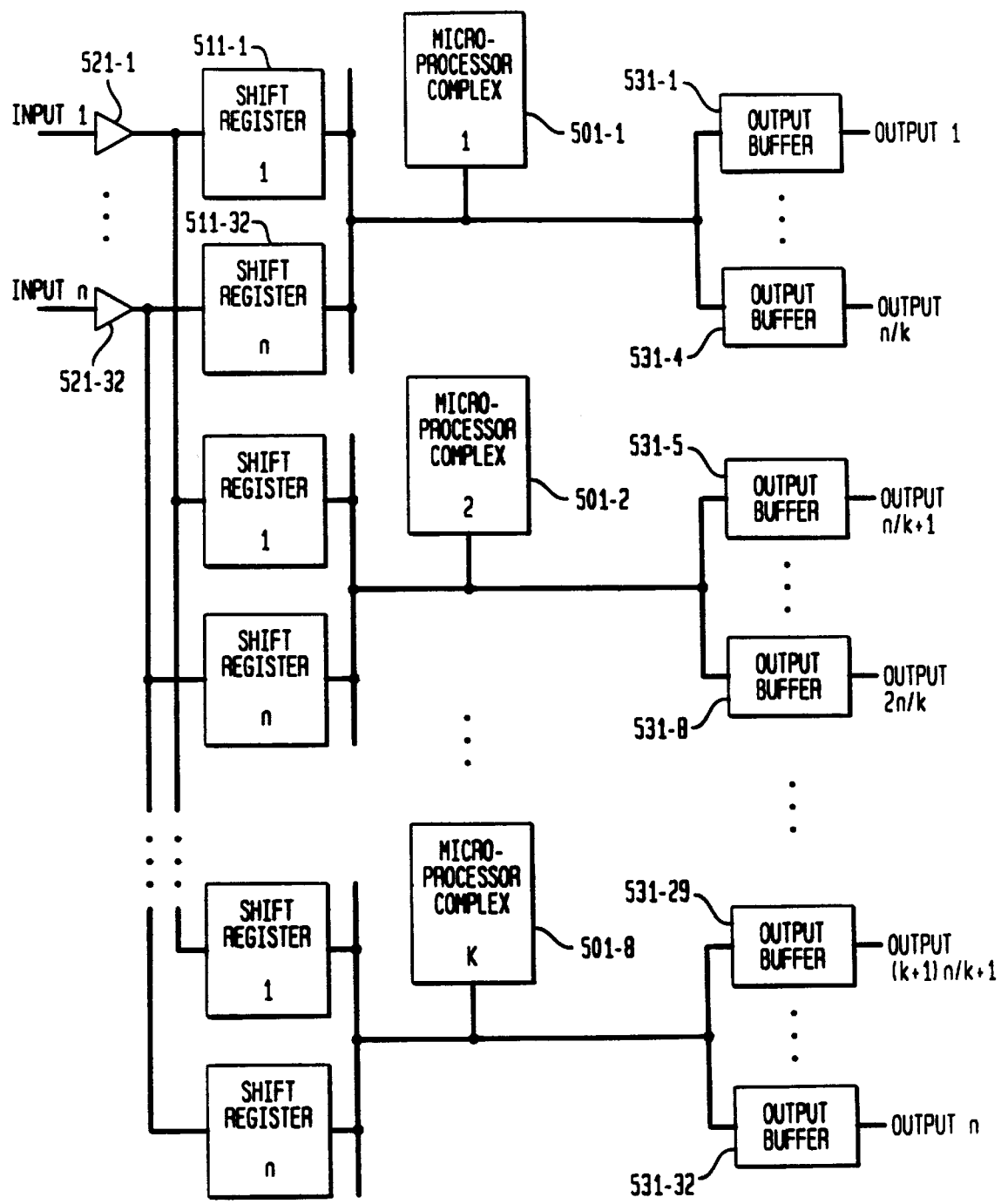
FIG. 5 is a block diagram of a large switch.

FIG. 5 illustrates an arrangement for increasing the size of the TSI of FIG. 1. FIG. 5 shows an implementation that can be applied to any number n of input signals, any number k of microprocessor complexes and any number n over k, that can be accommodated by the speed and memory capacity of these complexes. In the specific embodiment of FIG. 5, n is 32, k is 8 and n over k is 4. Each of the input streams, terminated at the buffer amplifiers 521-1, . . . , 521-32 is connected to a shift register input buffer similar to the input buffer 101. For microprocessor complex 501-1 shift registers 511-1, . . . ,511-32 are connected to local bus 541-1, from which microprocessor complex 501-1 accepts inputs. The same arrangement is available for each of the 7 other microprocessor complexes 501-2, . . . , 501-8. Each microprocessor complex feeds only four of the total 32 output buffers. For example, microprocessor complex 501, feeds output buffers 531-1, . . . , 531-4. The capacity of each microprocessor complex must be adequate to take inputs from the full range of input shift registers, but need only drive 1 over k of the output streams. Fortunately, the absorption of the inputs is done in parallel since input signals are loaded into sequential locations in the TSI buffer 301, 303 of each microprocessor. Thus, very large amounts of input data can be absorbed per unit time in the microprocessor caches. It is only the output data which requires sequential time slot by time slot or group by group processing by the microprocessor.

The arrangement of local shift registers per microprocessor complex has the advantage of limiting high bandwidth connections to the nearby locality of each microprocessor, with the corresponding disadvantage of requiring replicated shift registers for each microprocessor. In another arrangement that might sometimes be advantageous, a single global set of shift registers could be used, with each microprocessor in lockstep, absorbing the same input data at the same time. In this case the complexity of high bandwidth global connections and global microprocessor synchronization would be traded against the savings of a set of shift registers for all but one of the microprocessors.

Theoretically, it is possible to take input data and process the input data serially in order to generate pre-ordered output data. The arrangement of FIG. 5 does not work satisfactorily for that kind of arrangement (processing inputs serially to generate parallel outputs), because for each input word that is received in parallel, different microprocessors are required to do different amounts of processing since each processor may process a different number of bytes to generate output streams for its outputs.

Implementing a Time Multiplexed Switch (TMS)

The RISC microprocessor hardware of FIG. 1, the block diagram of FIG. 2 and the programmer data model of FIG. 3 can also be used for implementing a TMS. The basic difference is that a TSI application requires the storing and maintaining in memory of either one or two frames of time slots (single or double buffered applications), whereas a TMS application requires the switching of the time slots as soon as possible after they appear at the input to the TMS. This means that after the serial input streams appearing at 101, . . . , 102 (which have been written into the TSI buffer of FIG. 3) are read out to the serial output streams 111, . . . , 112, their storage in the TSI buffer is no longer necessary. Therefore, subsequent write bursts into this buffer during the frame interval can overwrite the old data. This means that less memory is required for the TMS application than the TSI application since only 32 bytes (the write burst size) per serial input are required rather than one or two frames of memory. Also, double buffering is not required for nx64 kbits per second because the time slots are read out immediately and thus there is no possibility of the time slots getting out of sequence.

Figure 6:
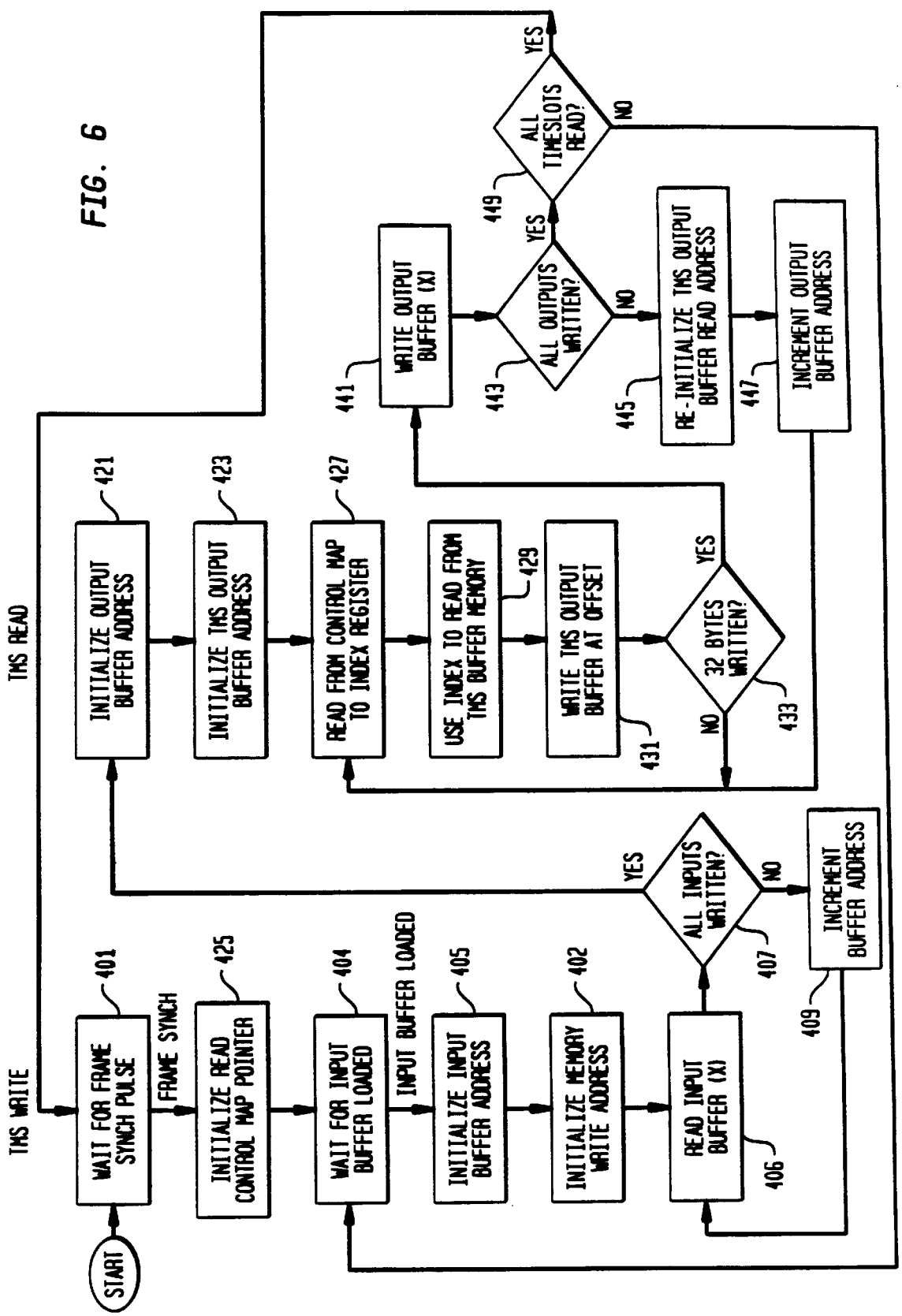

FIG. 6 is a flow chart for implementing a TMS. It is very similar to the TSI basic flow chart (FIG. 4) and incorporates the changes described earlier for generalized TSI flow, as well as the differences described above for a TMS. To help the reader, the same action is given the same number as in FIG. 4. For a TMS high bandwidth facilities much larger than the 2.048 Mbits per second assumed for the basic TSI flow chart are required. This requires the addition of test 449 in FIG. 6 in order to handle the entire frame, and moving the initialize read control pointer action block (425) from the TSI read cycle to the frame initialization portion near the beginning of TMS write cycle of FIG. 6. These two steps are the same as those described for a generalized TSI flow.

To implement TMS functionality the only two changes to the flow chart are:
1) Move action block 402 from the frame initialization portion of the TSI write to the buffer loaded inner loop so it can overwrite the previous burst, since as described in the previous paragraph this data has already been output and
2) Eliminate action block 403 which is used to implement double buffering. The TMS flow chart of FIG. 6 implements the time multiplexed switching function.

A variation on writing the input buffers 101, . . . , 102 sequentially into cache is that rather than take a 32 byte burst from a single input buffer, 8 bytes from each of four input buffers can be written. This has the advantage of reducing the number of bytes of buffering required by input buffers 101, . . . , 102 from 32 bytes to 8 bytes per buffer. Taking 16 bytes from each of two buffers can also be implemented.

While the preferred embodiment shows sequential storage of input time slots and readout based on the control memory contents, it is also possible to use storage based on control memory contents in conjunction with sequential readout, although such an arrangement handles broadcast connections less efficiently. The arrangement of FIG. 5 does not work satisfactorily for broadcasting in the non-preferred arrangement (storage based on control memory and sequential readout), because for each input word that is received, different microprocessors may be required to do different amounts of processing.

The above description is of one preferred embodiment of applicants' invention. Many other embodiments can be designed by those of ordinary skill in the art without departing from the scope of applicants' invention. The scope of the invention is limited only by the claims.

We claim:

1. A telecommunications circuit switch, comprising;
    a microprocessor comprising a cache;
    a plurality of input buffers each for receiving an input bit stream; and
    a plurality of output buffers each for transmitting an output bit stream;
    said microprocessor connected to said input buffets by a multi-byte bus for receiving a plurality of bytes, each byte representing a time slot, for storage in sequential locations of said cache;
    said microprocessor, operative under the control of a program for:
        controlling parallel byte reception and storage in said cache of said plurality of bytes from said input buffers; and
    using a control map stored in said cache, controlling transmission of bytes from said cache to each of said plurality of output buffers, thereby flexibly switching bytes from any of a plurality of input streams to a plurality, of different output streams;
    wherein contents of said input streams are switched to said output streams under the control of said control map without using the contents of said time slots.

2. The circuit switch of claim 1, wherein each of said pluralities of input buffers and output buffers is connectable to a synchronous bit stream.

3. The circuit switch of claim 2, wherein said circuit switch is a time slot interchange.

4. The circuit switch of claim 1, wherein said circuit switch is a time multiplexed switch.

5. The circuit switch of claim 1, further comprising a plurality of microprocessors, wherein each of said microprocessors receives inputs from all of said input buffers, but transmits outputs to a separate subset of said output buffers.

6. The circuit switch of claim 1, wherein said microprocessor is further operative under program control for controlling transmission of groups of bytes to each of a plurality of output buffers;
    whereby channel groups can be efficiently switched as entities for performing a digital access and cross connect function.

7. A telecommunications circuit switch, comprising:
    a microprocessor comprising a cache;
    a plurality of input buffers each for receiving a PCM (Pulse Code Modulation) input bit stream; and
    a plurality of output buffers each for transmitting a PCM output bit stream;
    said microprocessor connected to said input buffers by a multi-byte bus for receiving a plurality of bytes representing time slots for storage in sequential locations of said cache;
    said microprocessor, operative under the control of a program for:
        controlling parallel byte reception and storage in said cache of said plurality of bytes from said input buffers; and
    using a control map stored in said cache, controlling transmission of bytes from said cache to each of said plurality of output buffers, thereby flexibly switching bytes from one of the plurality of input streams to one of the plurality of output streams;
    wherein contents of said input streams are switched to said output streams under the control of said control map without using the contents of said time slots.

8. The circuit switch of claim 7, wherein said circuit switch is a time slot interchange.

9. The circuit switch of claim 7, wherein said circuit switch is a time multiplexed switch.

10. The circuit switch of claim 7, further comprising a plurality of microprocessors, wherein each of said microprocessors receives inputs from all of said input buffers, but transmits outputs to a separate subset of said output buffers.

11. The circuit switch of claim 7, wherein said microprocessor is further operative under program control for controlling transmission of groups of bytes to each of a plurality of output buffers;
    wherein contents of said input streams are switched to said output streams under the control of said control map, and independent of the content of said input streams;
    whereby channel groups can be efficiently switched as entities for performing a digital access and cross connect function.

* * * * *